US010855076B2

(12) United States Patent
Hierl et al.

(10) Patent No.: US 10,855,076 B2
(45) Date of Patent: Dec. 1, 2020

(54) DOMESTIC ENERGY GENERATION INSTALLATION AND OPERATING METHOD FOR OPERATING A DOMESTIC ENERGY GENERATION INSTALLATION

(71) Applicant: HPS HOME POWER SOLUTIONS GMBH, Berlin (DE)

(72) Inventors: Andreas Hierl, Berlin (DE); Dirk Radue, Berlin (DE); Gunnar Schneider, Wildau (DE); Uwe Benz, Uhldingen (DE); Kevin Schroder, Berlin (DE); Zeyad Abul-Ella, Berlin (DE)

(73) Assignee: HPS HOME POWER SOLUTIONS GMBH, Berlin (DE)

( * ) Notice: Subject to any disclaimer, the term of this patent is extended or adjusted under 35 U.S.C. 154(b) by 133 days.

(21) Appl. No.: 15/777,985

(22) PCT Filed: Nov. 24, 2016

(86) PCT No.: PCT/EP2016/078690
§ 371 (c)(1),
(2) Date: Sep. 5, 2018

(87) PCT Pub. No.: WO2017/089468
PCT Pub. Date: Jun. 1, 2017

(65) Prior Publication Data
US 2019/0067945 A1    Feb. 28, 2019

(30) Foreign Application Priority Data

Nov. 25, 2015   (DE) .................. 10 2015 120 450

(51) Int. Cl.
*H02J 3/14*       (2006.01)
*H02J 3/32*       (2006.01)
(Continued)

(52) U.S. Cl.
CPC .............. *H02J 3/14* (2013.01); *F24H 9/2021* (2013.01); *G05B 13/048* (2013.01);
(Continued)

(58) Field of Classification Search
CPC .. F24H 9/2021; G05B 13/048; H01M 16/006;
H01M 2220/10; H01M 2250/10;
(Continued)

(56) References Cited

U.S. PATENT DOCUMENTS

2002/0177021 A1* 11/2002 Fuglevand ........ H01M 8/04567
429/432
2008/0148732 A1*  6/2008 Fein ...................... B60K 16/00
60/641.3

(Continued)

*Primary Examiner* — Yuhui R Pan
(74) *Attorney, Agent, or Firm* — Ware, Fressola, Maguire & Barder LLP

(57) ABSTRACT

A method for operating a domestic energy generation installation comprises ascertaining or prespecifying at least one expectation time period, ascertaining an expected load profile of an electrical consumer, ascertaining an expected yield profile of the regenerative energy source in the expectation time period, ascertaining or prespecifying a minimum consumption power which should be available for withdrawal from the storage battery unit, ascertaining an energy balance over one expectation time period from the expected yield profile and the expected load profile, ascertaining a time range of the storage battery unit from the expected load profile, the expected yield profile and the minimum consumption power, which should not be undershot at any time, and from a currently ascertained state of charge of the storage battery unit, operating the fuel cell unit depending on the ascertained time range and operating the electrolysis unit depending on the ascertained energy balance.

35 Claims, 7 Drawing Sheets

(51) Int. Cl.
   *H02J 3/38*    (2006.01)
   *F24H 9/20*    (2006.01)
   *G05B 13/04*   (2006.01)
   *H01M 8/0656*  (2016.01)
   *H01M 16/00*   (2006.01)
   *H02J 3/00*    (2006.01)

(52) U.S. Cl.
   CPC ....... *H01M 8/0656* (2013.01); *H01M 16/006* (2013.01); *H02J 3/32* (2013.01); *H02J 3/383* (2013.01); *H02J 3/387* (2013.01); *H01M 2220/10* (2013.01); *H01M 2250/10* (2013.01); *H02J 3/003* (2020.01); *H02J 2203/20* (2020.01); *H02J 2310/14* (2020.01); *Y02B 10/14* (2013.01); *Y02B 70/3266* (2013.01); *Y02E 10/563* (2013.01); *Y02E 10/566* (2013.01); *Y02E 70/30* (2013.01); *Y04S 20/242* (2013.01)

(58) Field of Classification Search
   CPC ............. H01M 8/0656; H02J 2003/003; H02J 2003/007; H02J 2003/143; H02J 3/14; H02J 3/32; H02J 3/383; H02J 3/387; Y02B 10/14; Y02B 70/3266; Y02E 10/563; Y02E 10/566; Y02E 70/30; Y04S 20/242

See application file for complete search history.

(56) References Cited

U.S. PATENT DOCUMENTS

| | | | |
|---|---|---|---|
| 2014/0070617 A1* | 3/2014 | Detmers | H02J 3/32 307/64 |
| 2014/0337002 A1* | 11/2014 | Manto | G06Q 50/06 703/18 |
| 2015/0147672 A1* | 5/2015 | Tatsui | H01M 8/04022 429/440 |
| 2016/0248137 A1* | 8/2016 | Curien | H01M 8/0656 |

* cited by examiner

Fig. 2

System 2
Air-cooled fuel cell with heat-recovery ventilation

DOMESTIC ENERGY GENERATION INSTALLATION AND OPERATING METHOD FOR OPERATING A DOMESTIC ENERGY GENERATION INSTALLATION

CROSS REFERENCE TO RELATED APPLICATIONS

This application is the U.S. National Stage of International Application Number PCT/EP2016/078690 filed on Nov. 24, 2016, which application claims priority under 35 USC § 119 to German Patent Application No. 10 2015 120 450.9 filed on Nov. 25, 2015. Both applications are hereby incorporated by reference in their entirety.

TECHNICAL FIELD

The present invention relates to a domestic energy generation installation and a method for operating a domestic energy generation installation.

BACKGROUND OF THE INVENTION

Domestic energy generation installations are generally known from prior art and serve the purpose of supplying houses, for example low-energy houses, passive houses and zero-energy houses, with energy in the form of heat and, in particular, in the form of power, for example power from renewable energy sources such as photovoltaic (PV) generators or small wind turbines.

Prior art domestic energy generation installations are currently still too expensive, complex and often do not fulfill the safety requirements for this specific use. Moreover, regenerative energy sources cannot be used consistently or regularly. So far, insufficiently efficient methods for operating domestic energy generation installations have been making it necessary to oversize domestic energy generation installations.

Due to decreasing feed-in tariffs and increasing energy costs as well as due to changed political framework conditions, the demand for such domestic energy generation installations which are mostly or completely self-sufficient—with regard to the demand for electrical energy, but also with regard to the demand for thermal energy—is increasing.

SUMMARY OF THE INVENTION

Against this background, it is the object of the present invention to specify a domestic energy generation installation and an operating method for operating a domestic energy generation installation which, preferably, are energetically advantageous.

Pursuant to a first aspect of the invention, the object is achieved by means of a method for operating a domestic energy generation installation for self-sufficient electricity supply and, preferably, for $CO_2$-neutral, self-sufficient heat supply, preferably for single- and two-family homes. The method comprises the following steps:
- determining or prespecifying at least one expectation time period, wherein the at least one expectation time period preferably extends until energy of a regenerative energy source is once again available after the next possible sunrise,
- determining an expected load profile of an electricity consumer, in particular the electric power consumption of said electricity consumer during the at least one expectation time period,
- determining an expected yield profile of the regenerative energy source in the at least one expectation time period, preferably an electric PV power of a PV generator,
- determining or prespecifying a minimum consumption power which should at least be available for withdrawal from the storage battery unit at any one time, and/or prespecifying an end-of-discharge voltage of the storage battery unit which should not be undershot at any time,
- determining an energy balance over at least one expectation time period from the expected yield profile and the expected load profile,
- determining a time range of the storage battery unit from the expected load profile, the expected yield profile and the minimum consumption power, which should not be undershot at any time, and from a currently determined state of charge of the storage battery unit and, preferably, from the end-of-discharge voltage,
- operating the fuel cell unit with a fuel cell power depending on the determined time range of the storage battery unit, in particular, switching on the fuel cell unit if the determined time range of the storage battery unit is shorter than the at least one expectation time period and/or switching off the fuel cell unit if the determined time range of the storage battery unit is longer than the at least one expectation time period, and
- operating the electrolysis unit, in particular with a calculated electrolysis power, depending on the determined energy balance, in particular, switching on the electrolysis unit if the determined energy balance is positive and/or switching off the electrolysis unit if the determined energy balance is negative.

The method pursuant to the invention creates a predictive energy management for a hybrid domestic energy generation installation which is energy self-sufficient with regard to electricity and, preferably, also with regard to heat.

Pursuant to a second aspect of the invention, the object is achieved by means of a domestic energy generation installation comprising:
- a DC injection point, preferably designed for a nominal voltage of 48 volt, and/or an AC injection point, preferably designed for a voltage of 230 volt, wherein, during operation, the DC injection point and/or the AC injection point are, at least intermittently, connected to an electricity consumer having a consumption power,
- a PV generator at least intermittently electrically connected to the DC injection point for generating an electric PV power,
- a fuel cell unit at least intermittently electrically connected to the DC injection point for generating electric fuel cell power,
- an electrolysis unit electrically connected to the DC injection point for generating hydrogen to be consumed by the fuel cell unit, wherein, during operation, the electrolysis unit is supplied electric electrolysis input power,
- a hydrogen tank, in particular a long-term energy storage unit, which is, at least intermittently, fluidly connected to the fuel cell unit and the electrolysis unit and is designed to store hydrogen to be generated by means of the electrolysis unit and to be consumed by the fuel cell unit,
- a storage battery unit, in particular in the form of a short-term energy storage unit, which is or is to be electrically connected to the DC injection point so that an electric PV power and an electric fuel cell power can be stored in the storage battery unit and an electric electrolysis input power and a consumption power can be withdrawn from the storage battery unit; and and a control module for controlling the domestic energy generation installation.

The method pursuant to the invention of the first aspect of the invention is controlled by the control module of the domestic energy generation installation pursuant to the second aspect of the invention. Preferably, the control module of the domestic energy generation installation pursuant to the second aspect of the invention is designed to control the method pursuant to the invention in accordance with the first aspect of the invention.

The domestic energy generation installation pursuant to the invention creates the foundation for making it possible to meet the energy demand of a house, in particular of a low-energy house, a passive house or a zero-energy house, both with regard to electricity and heat requirements, completely through renewable energy sources leading to an entirely $CO_2$-free operation. At least, however, the electricity demand of a house within the scope of a desirable increase of own consumption is able to be met almost entirely through renewable energy sources, in particular by means of a PV generator and/or a small wind turbine.

The domestic energy generation installation pursuant to the invention also creates the foundation of a self-sufficient energy supply ("off-grid") of a house, in particular of a low-energy house, a passive house or a zero-energy house.

Hereinafter, advantageous embodiments of the domestic energy generation installation pursuant to a second aspect of the invention are described.

The domestic energy generation installation is designed to be grid-independent, in particular for an electrically grid-independent operation of a single- or two-family home. The PV generator may be designed for a PV power of between 4 kilowatt-peak (kWp) and 20 kWp. Preferably, the fuel cell nominal power is between 600 watt and 2500 watt. The electrolysis nominal input power may be between 500 watt and 5000 watt.

The fuel cell unit can be an air-cooled and/or water-cooled fuel cell unit. The fuel cell unit may be thermally connected to a ventilation-heating device designed to ventilate and/or heat a living space so that a fuel cell heat amount can be released into the living space.

In a preferred embodiment, the fuel cell unit is provided as an air-cooled fuel cell unit and is or is able to be thermally connected to the ventilation-heating device designed to ventilate and/or heat the living space via an air duct, in particular a feed air duct. Via an airflow, a fuel cell heat amount can be supplied to the ventilation-heating device and/or to the living space. This embodiment is preferably used in case of new buildings, in particular low-energy houses, passive houses or zero-energy houses, since controlled heat-recovery ventilation which might comprise a ventilation-heating device designed to ventilate and/or heat the living space will typically already be provided.

In another embodiment, the fuel cell unit can be provided as a water-cooled fuel cell unit. The fuel cell unit may be or be able to be thermally connected to a thermal storage unit via a coolant line so that a fuel cell heat amount can be released into the hot water storage unit. This embodiment is preferably used for existing buildings, in particular old buildings, since typically no controlled heat-recovery ventilation will be provided. Preferably, the thermal storage is provided as a hot water storage unit. The thermal storage unit may be provided as a latent heat storage unit.

Alternatively or in addition, the fuel cell unit may be thermally connected or thermally connectable to the ventilation-heating device designed to ventilate and/or heat the living space via a coolant line. The ventilation-heating device may have a hot water heating coil via which a hot water heat amount from the hot water storage unit and/or an electrolysis heat amount of the electrolysis unit can be released into the living space.

Preferably, the fuel cell unit and the electrolysis unit are arranged in a shared housing and preferably the exhaust airflow of the house flows through them for the purpose of diluting and disposing off flamable gases as well as for the purpose of cooling and using waste heat. A heat amount contained in the flushing air of the shared housing is preferably transferred to a feed airflow for the living space via an air-air heat exchanger. It is particularly preferred that the air-air heat exchanger is a cross flow or cross counter-flow heat exchanger.

It is particularly preferred that the storage battery unit and/or the catalytic $H_2$ combustor are integrated into the shared housing. The battery storage unit may be arranged in a separate housing, which is, in particular with regard to ventilation, connected to the main housing. This is advantageous, since a shared flushing airflow can be used for using waste heat and/or for the safe dilution and the disposal of potentially leaking flammable gases, in particular hydrogen. The shared flushing airflow is preferably the exhaust air of the living space, which absorbs the waste heat of all the components of the building and which is transferred out of the building as outgoing air via the air-air heat exchanger. Pursuant to the invention, a separate flushing airflow, which is independent from a controlled heat-recovery ventilation and which can optionally feed the absorbed heat into a hot water storage unit via an air-water heat exchanger and/or release heat energy preferably into the hot water storage unit via a small heat pump, is also included.

It has proven to be advantageous if the domestic energy generation installation has an additional burner, in particular a burner from the group of catalytic hydrogen combustors, gas heaters, pellet boilers. Having a catalytic hydrogen combustor as an additional burner has the advantage that the domestic energy generation installation is also able to meet a potentially occurring peak heat demand in a $CO_2$-free manner. Using a pellet boiler as an additional burner has the advantage that the domestic energy generation installation is able to meet a potentially occurring peak heat demand at least in a $CO_2$-neutral manner. On the output side, the additional burner may, at least intermittently, be thermally connected to the hot water storage unit, preferably in such a way that a heating heat amount can be released into the hot water storage unit.

The domestic energy generation installation may comprise an electricity supply connection via which the domestic energy generation installation is, at least intermittently, connected to a low voltage grid and/or a fuel connection via which the domestic energy generation installation is, at least intermittently, connected to a gas grit or to an oil storage unit.

In another preferred embodiment the domestic energy generation installation comprises a small wind turbine for generating electric wind energy power. The storage battery unit may, at least intermittently, be connected to the small wind turbine so that an electric wind power can be stored in the storage battery unit. The advantage of this embodiment is that, in the form of the wind energy, another regenerative energy source, which is decoupled from the availability of sun energy, is available, making it possible to significantly reduce the size of the energy storage unit, in particular the size of the long-term energy storage unit.

The storage battery unit may be or comprise a lead battery, preferably an OPzV gel battery or an OPzS acid battery. The storage battery unit may be or comprise an Li-based or an NiMeH-based high-performance battery. The storage battery unit may be or comprise a redox flow battery. Alternatively, or in addition, the storage battery unit may be or comprise an Na-nickel chloride battery (Zebra cell). Several batteries of the same or of different kinds may be provided. Preferably, the capacity of the storage battery unit is: 150 Ah to 1500 Ah at 48 V nominal voltage.

Preferably, the battery storage unit is used as a short-term energy storage unit, i.e. in particular for storing electrical energy for a few days, no more, however, than for a week. The invention expressly includes the coupling of the different types of storage battery units mentioned above with ultra-short-term storage units, in particular of super capacities or high-performance batteries with an Li basis, in order to buffer very short-term peak loads. This has, in particular, positive effects on the service life of the generally expensive short-term energy storage unit and increases the short-term power reserves in case of substantially discharged storage battery units.

Preferably, the hydrogen storage unit is used as a long-term energy storage unit, i.e. in particular for storing hydrogen for several days to weeks up to one heating season. Preferably, the hydrogen storage tank has a storage capacity of 15 kg to 80 kg $H_2$ at a nominal operating pressure of the hydrogen storage tank of 20-100 bar in the medium pressure range or 100 bar to 1000 bar in the high pressure range.

Preferably, the hot water storage unit is used as a short-term energy storage unit for thermal energy and, in particular in connection with an electric heating element, for the dynamic compensation of electrical loads (load levelling), i.e. in particular for storing thermal energy for a few days, no longer, however, than one week.

Hereinafter, advantageous realizations of the method for operating a domestic energy generation installation pursuant to the first aspect of the invention are described.

For the predictive energy management, energy balances over certain expectation time periods are constantly being determined during operation. In the following, the method is explained in a simplified way based on the availability of regenerative energy from a PV installation. However, the method may be modified or extended accordingly for the availability of other regenerative energy sources, such as wind energy. Preferably, the balance is determined over a short-term expectation time period and, optionally, over partial time periods thereof, which contains as a prominent point in time the sunset and/or the point in time before the sunset, at which the power generated in a regenerative manner is significantly smaller than the average power generated in a regenerative manner. Preferably, the short-term expectation time period ends upon sunrise or, respectively, upon the point in time after the sunrise at which the power generated in a regenerative manner once again reaches a defined fraction of the average power generated in a regenerative manner. In the following, for simplification purposes, the sunset or the sunrise, respectively, are referred to as the prominent points in time in the short-term expectation period.

It is particularly preferred to also create for the energy management a balance over a mid-term expectation time period extending over several days and/or over a long-term expectation time period extending for example over an annual cycle.

The step of determining the expected load profile of the electricity consumer preferably comprises at least one time sequence which extends over the full annual cycle and represents the typical consumption of electrical energy as well as the consideration of user input regarding the expected intensity of the energy consumption and/or the consideration of user-specific and/or temporary data of any kind, which is entered into the predictive energy management via central remote management systems. Preferably, the user has the option to influence the expected performance profile the energy management is based on by choosing from different user-individual standard load profiles. The user input makes it, in particular, possible to choose between performance-intensive and economical profiles.

It is particularly preferred that the step of determining an expected yield profile of the PV generator is performed taking into account long-term and climate data that is, in particular, chronologically detailed and/or specific to the installation location of the PV generator, such as solar radiation, wind speed, temperature, as well as, if available, short-term weather forecasts from weather services or created with the help of information regarding the expected energy yield, which are entered into the central remote management system.

The determining or prespecifying of a minimum consumption power can be influenced interactively via the user.

Taking into consideration the at least one expectation time period, at least one energy balance and one target state of charge of the storage battery unit is calculated respectively for the sunrise and, optionally for the sunset. The energy balance will be positive, if, with regard to the state of charge of the previous expectation time period, a higher state of charge of the storage battery unit would be achievable, i.e. usually if, taking into consideration the relevant efficiency of the energy conversion and storage, it is expected that more regenerative energy will be generated than will be consumed. Taking into account the actual states of charge and the balances of the mid- and long-term expectation time periods, a new target state of charge of the storage battery unit is defined n the energy management. In order to achieve the target state of charge, it may be necessary for the long-term energy storage unit to release energy to the 48 V DC injection point, i.e. that the fuel cell is operated with a power and/or energy supply amount prespecified by the energy management or that the electrolysis unit is operated with a power and/or energy absorption amount prespecified by the energy management. The current power of the fuel cells or electrolysis is determined by the energy management by also taking into account the current power flows in the entire energy system.

In a preferred embodiment, the electrolysis unit is operated dynamically with regard to the input power. In a preferred embodiment, the electrolysis unit is switched on in case of surplus power, i.e. if the total amount of all the electricity consumers, including, in particular, the battery charging power, supplied by the domestic energy generation installation over a certain period of time is smaller than the power generated in a regenerative manner, in particular the PV power.

Preferably, the method includes dynamic load levelling, which may be performed both via electric heating of the hot water storage unit and via the operation of the electrolysis unit. A division of the electrical load to be leveled between levelling by means of electric heating of the hot water storage unit and leveling by means of the operation of the electrolysis unit may be performed in dependence on the hydrogen or heat requirements of a house and/or taking into consideration the quicker dynamics of a heating resistor compared to the dynamics of the electrolysis unit. Preferably, the control module is configured to divide the electrical load to be levelled.

It is particularly preferred that the fuel cell unit will be switched on if, at the end of the short-term expectation time period, energy from the long-term storage unit is required for achieving the target state of charge of the storage battery unit. The switch-on time, switch-off time and the output of the fuel cell are determined via the predictive energy management and the fuel cell is operated until, taking into account the updated yield and consumption profile at the end of the short-term expectation time period, the storage battery unit is able to achieve a prespecified or respectively newly calculated state of charge target value.

The fuel cell unit is preferably operated at optimum efficiency. It has turned out that the optimum efficiency of fuel cell units having a fuel cell nominal power of 600 W to 5000 W is in the range from 25 to 75 percent of the fuel cell nominal power. If an intermittently higher electrical load has to be levelled, the fuel cell unit is preferably operated, at least intermittently, at an increased fuel cell power of up to 175 percent of the fuel cell nominal power.

If the power demand is very small, the fuel cell unit may be operated intermittently, preferably in such a way that the times in stand-by are respectively less than 10 minutes.

Preferably, the electrolysis unit is operated at optimum efficiency. It has turned out that the optimum efficiency of electrolysis units having an electrolysis nominal input power of 500 W to 5000 W is in the range between approx. 25 to 75 percent of the electrolysis nominal input power.

In a particularly preferred realization of the method the electrolysis unit is operated in a performance-oriented manner, in particular in dependence on the determined energy balance. Preferably, the electrolysis unit can be operated with an electrolysis input power of less than 50% of the nominal power if the determined energy balance is smaller than or equal to 0 so that the electrolysis unit must, at least intermittently, be operated by means of the storage battery unit. Alternatively, or in addition, the electrolysis unit is operated in a performance-oriented manner, in dependence on the fill height of the hydrogen tank.

It has proven to be advantageous that the electrolysis unit will not be operated if an electric PV power that is expected to be able to be generated by the PV generator is not sufficient for bringing the storage battery unit into the previously calculated state of charge by sunset.

The method may, for example, have the effect that at night, the storage battery unit is not being charged by the fuel cell unit at all, or only partially, and/or that the storage battery unit is kept at a state of charge of below 70 percent. The method may also have the effect that, during the day, the storage battery unit is charged via the PV generator and/or that the storage battery unit is kept at a state of charge of more than 70 percent. The method may require that the electrolysis unit is operated independently from an actually supplied electric PV power, in particular that the electrolysis unit is also operated at night, in order to have the storage battery unit substantially discharged at sunset to such an extent that, during the day, a particularly high charging power as well as a particularly large amount of PV energy can be directly stored in the storage battery unit.

In a particularly preferred realization of the method, the heating rod arranged in the hot water storage unit will be electrically connected to the DC injection point and/or the AC injection point if a power surplus exists at the respective injection point which cannot be absorbed by the electrolysis unit in the form of an electrolysis input power.

The method may require that maintenance charging of the storage battery unit is performed independently from the electric PV power. Maintenance charging of the storage battery unit will preferably be started by the predictive energy management if, by sunset, at least approx. 85% of the state of charge of the storage battery unit are achieved via the regenerative energy source and if, at sunrise, a high target state of charge was determined, for example because a relatively small amount of regenerative energy was to be expected on the respective day. The energy demand and the necessary voltage level for the maintenance charging of the storage battery unit are provided via the fuel cell. The point in time of the maintenance charging may be varied by the predictive energy management within wide limits and the target state of charge may be changed in order to compensate for negative effects on the battery life; preferably, the minimum state of charge of the storage battery unit is increased in case of delayed maintenance charging.

In a particularly preferred realization of the method, the fuel cell unit is operated via a 48 volt DC injection point of the domestic energy generation installation, in particular without a voltage converter upstream of the fuel cell unit. In this case, the efficiency of the fuel cell and the instantaneous power are defined by the current bus voltage at the DC injection point and the average power of the fuel cell is able to be varied within wide limits via intermittent operation.

Further preferable realizations and embodiments of the invention can be inferred from the respective sub-claims.

In order to be able to advantageously use the exhaust heat of the domestic energy generation installation, the method may comprise the following steps:
- guiding outside air from outside a living space as direct feed air into a living space or, as indirect feed air, first through the fuel cell unit and then into the living space,
- guiding exhaust air from the living space via the electrolysis unit, in particular before said exhaust air is discharged from the domestic energy generation center as outgoing air.

Preferably, the method comprises the following steps:
- generating a PV total power amount by means of the first and second PV generator,
- injecting a PV partial power amount generated by the first PV generator into an AC injection point of the domestic energy generation installation, in particular by means of a PV inverter, and injecting surplus power of the first PV generator into a DC injection point,
- injecting a PV partial current amount generated by the second PV generator into a DC injection point, in particular by means of a DC-DC solar charge regulator,
- injecting power from the DC injection point via an island inverter into the AC injection point if the power of the first PV generator is not sufficient for the entire AC load,
- injecting power from the DC injection point into the short-term energy storage unit, preferably a battery storage unit, and/or into the long-term energy storage unit, preferably a system consisting of a fuel cell unit, electrolysis unit and hydrogen storage unit.

BRIEF DESCRIPTION OF THE DRAWINGS

In the following, exemplary embodiments of the present invention are explained by way of example with references to the attached figures. The following is shown in FIG. 1 a schematic illustration of a first exemplary embodiment of a domestic energy generation installation;

FIG. 2 a schematic illustration of a second exemplary embodiment of a domestic energy generation installation;

DETAILED DESCRIPTION

Figure 1:
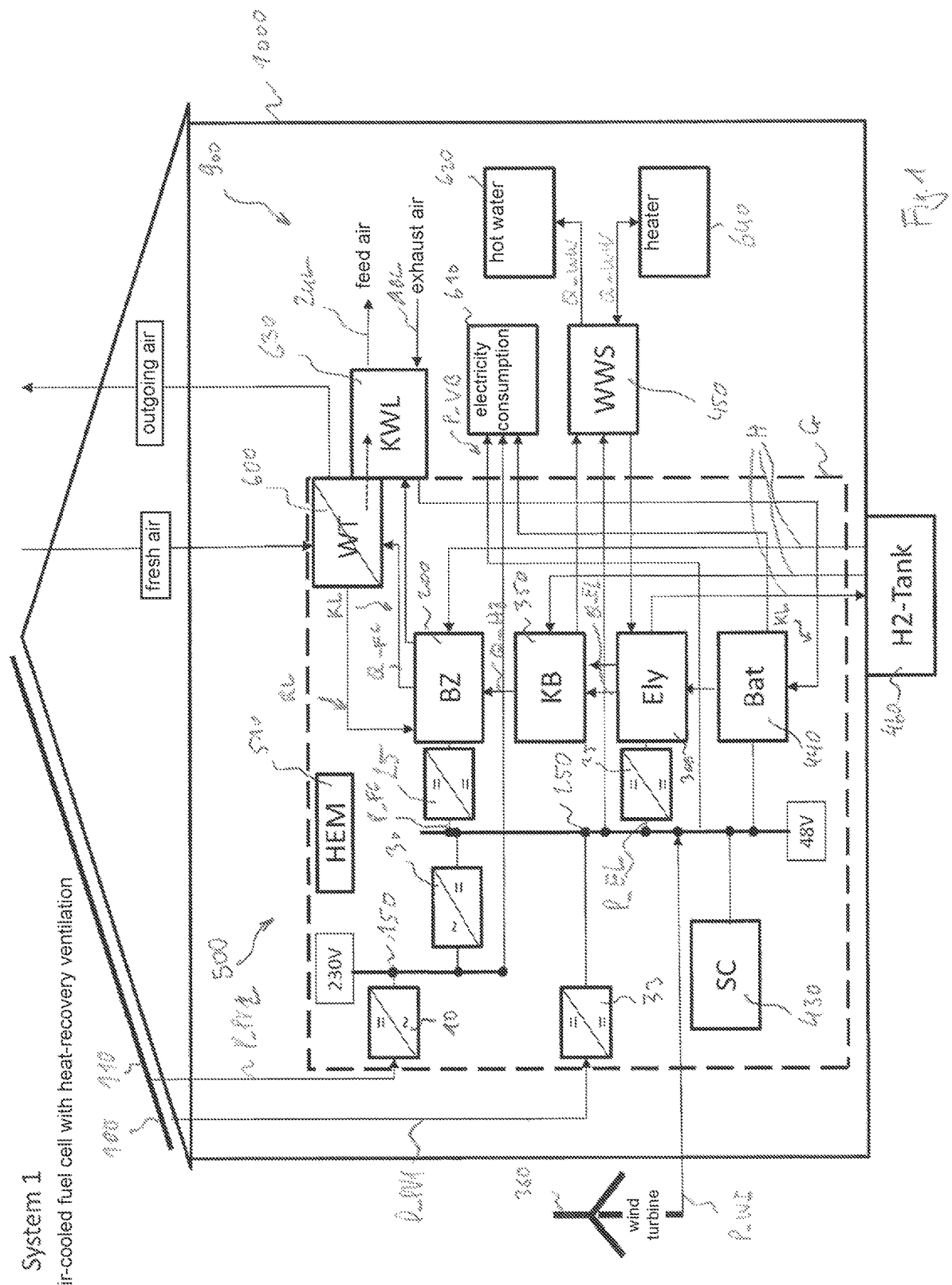

A passive house 1000 in FIG. 1 is equipped with a domestic energy generation installation 500 pursuant to the invention so that the passive house 1000 can be operated in an entirely energetically self-sufficient and $CO_2$-free manner. The domestic energy generation installation 500 of FIG. 1 is "off-grid" capable. The domestic energy generation installation comprises an DC injection point 250 designed for direct voltage of 48 volt, and an AC injection point 150 designed for alternating voltage of 230 volt.

The domestic energy generation installation 500 comprises a first PV generator 100 arranged on the roof of the passive house 1000 for generating a first electric PV power P_PV1 and, galvanically isolated from it, a second PV generator 110 for generating a second electric PV power P_PV2. The domestic energy generation installation 500 also comprises a fuel cell unit 200 for generating an electric fuel cell power P_FC. The, in the present embodiment, air-cooled fuel cell unit 200 is thermally connected to a ventilation-heating device 630, in the present example a controlled heat-recovery ventilation, designed to ventilate and heat a living space 900, so that a fuel cell heat amount Q_FC can be released into the living space 900. In the present case, the fuel cell unit 200 is thermally connected to the ventilation-heating device 630 designed to ventilate and heat the living space 900 via a feed air duct ZUL. A fuel cell heat amount Q_FC is guided to the ventilation-heating device 630 via an airflow and to the living space 900 by means of an airflow.

Furthermore, the domestic energy generation installation 500 comprises an electrolysis unit 300 for generating hydrogen H to be consumed by the fuel cell unit 200, wherein presently the electrolysis unit 300 is supplied with an electrical electrolysis input power P_EL.

A hydrogen tank 400 of the domestic energy generation installation 500 serves as a long-term energy storage unit and is fluidly connected to the fuel cell unit 200 and the electrolysis unit 300. The hydrogen tank 400 is designed to store hydrogen to be generated by means of the electrolysis unit 300 and to be consumed by the fuel cell unit 200.

The domestic energy generation installation 500 also comprises a storage battery unit 440 as a short-term energy storage unit, which is electrically connected to the DC injection point 250. A super condenser 430 is also electrically connected to the DC injection point 250 in order to buffer power peaks within the range of seconds. The storage battery unit 440 is electrically connected to the PV generator 100, the fuel cell unit 200, the electrolysis unit 300 and an electricity consumer 610, which may primarily comprise AC consumers, but optionally also DC consumers, and has a consumption power P_VB. Thus, the electric PV power P_PV and the electric fuel cell power P_FC can be stored in the storage battery unit 440 and the electric electrolysis input power P_EL as well as the consumption power P_VB can be withdrawn from the storage battery unit 440.

An electrolysis heat amount Q_EL can be released into the hot water storage unit 450 via a hot water storage unit 450 which, at the input side, is thermally connected to the liquid-cooled electrolysis unit 300. At the output side, the hot water storage unit 450 is thermally connected to a hot water heating circuit 640 and a water consumer 620 so that a hot water heat amount Q_WW can be released into the living space 900 via the hot water heating circuit 640, preferably via floor heating (not shown) and/or via hot water radiators and/or optionally via a hydraulic heating coil (not shown) connected to the controlled heat-recovery ventilation 630 and the water consumer 620. Furthermore, the domestic energy generation installation 500 has an air-air heat exchanger 600 which is thermally connected to the flushing and cooling air KL of the domestic energy generation installation 500 and via which the largest part of the exhaust heat of the domestic energy generation installation 500 released into the flushing and cooling air KL is transferred into a feed airflow of the feed air duct ZUL.

In the present example, the domestic energy generation installation 500 of FIG. 1 comprises an additional burner in the form of a catalytic hydrogen combustor 350. On the output side, said catalytic hydrogen combustor 350 is thermally connected to the hot water storage unit 450 so that a heating heat amount Q_HZ can be released into the hot water storage unit 450. On the input side, the catalytic hydrogen combustor 350 is connected to the hydrogen tank 400 via a fluid connection and is supplied with hydrogen H via the latter. Alternatively, a domestic energy generation installation may be provided without an additional burner in the form of a catalytic hydrogen combustor.

Furthermore, the domestic energy generation installation 500 comprises by way of example a small wind turbine 380 for generating an electric wind power P_WI. The storage battery unit 440 is electrically connected to the small wind turbine 380 so that the electric wind power P_WI can be stored in the storage battery unit 440.

The first PV generator 100 is coupled for unilateral injection to the DC injection point 250 via a DC-DC solar regulator 33. As shown in FIG. 1, the second PV generator 110 is connected to the AC injection point 150 via a grid-tie inverter 10. In the present example, the AC injection point 150 and the DC injection point 250 are connected via an off-grid inverter 30, which, in this exemplary embodiment, has a bi-directional configuration. The exemplary embodiment shown in FIG. 1 also shows respectively one unilaterally configured DC/DC converter 25 for both the fuel cell unit 200 and the electrolysis unit 300, which may, however, especially in the case of the fuel cell unit 200, be omitted in case of certain realizations and modes of operation.

The components of the domestic energy generation installation 500 are controlled via a control module 510 which is configured and connected accordingly. The presently described method pursuant to the first aspect of the invention is executed on the control module 510 in addition to general operating logic. In addition, the control module 510 provides the interface with the customer and, via remote data transmission also the interface with external systems, e.g. for data collection, controlling, diagnosis, remote maintenance and meteorological data.

An existing building 1100 in FIG. 2, for example a single-family home renovated with regard to its thermal characteristics to meet the low-energy standard, is also equipped with a domestic energy generation installation 500. Contrary to FIG. 1, centrally controlled heat-recovery ventilation is not installed in the existing building 100. In this case, the domestic energy generation installation 500 is equipped with a separate ventilation system 610 for flushing and cooling air KL. The ventilation system 610 includes a gas-gas heat exchanger 600', which is preferably designed as a cross flow or cross counter-flow heat exchanger. The feed air ZUL constitutes the flushing and cooling air KL and may be preheated via the gas-gas heat exchanger 600' or be guided passed the latter via a bypass. After the absorption of the waste heat and the emissions containing $H_2$ of all the components in the housing G of the domestic energy generation installation and/or of the cooling air of the fuel cell unit 200, heat can be withdrawn from the flushing and cooling air KL via an air-water heat exchanger (not shown) or a water pump 275 and coupled into the hot water storage unit 450. Subsequently, residual heat can be transferred into the feed air ZUL via the gas-gas heat exchanger 600' and the flushing and cooling air KL can be released into the surrounding environment as outgoing air FOL. Due to the generally higher heat demand of existing buildings 1100, an additional burner in the form of a pellet boiler 370 is present so that, from an electrical point of view, the existing building 1100 can be operated electrically in a 100% self-sufficient and at least $CO_2$-neutral manner. The domestic energy generation installation 500 of FIG. 2 is "off-grid" capable. A catalytic hydrogen-based combustor is not provided, since the pellet boiler 370 can take care of the heat supply.

Figure 3:
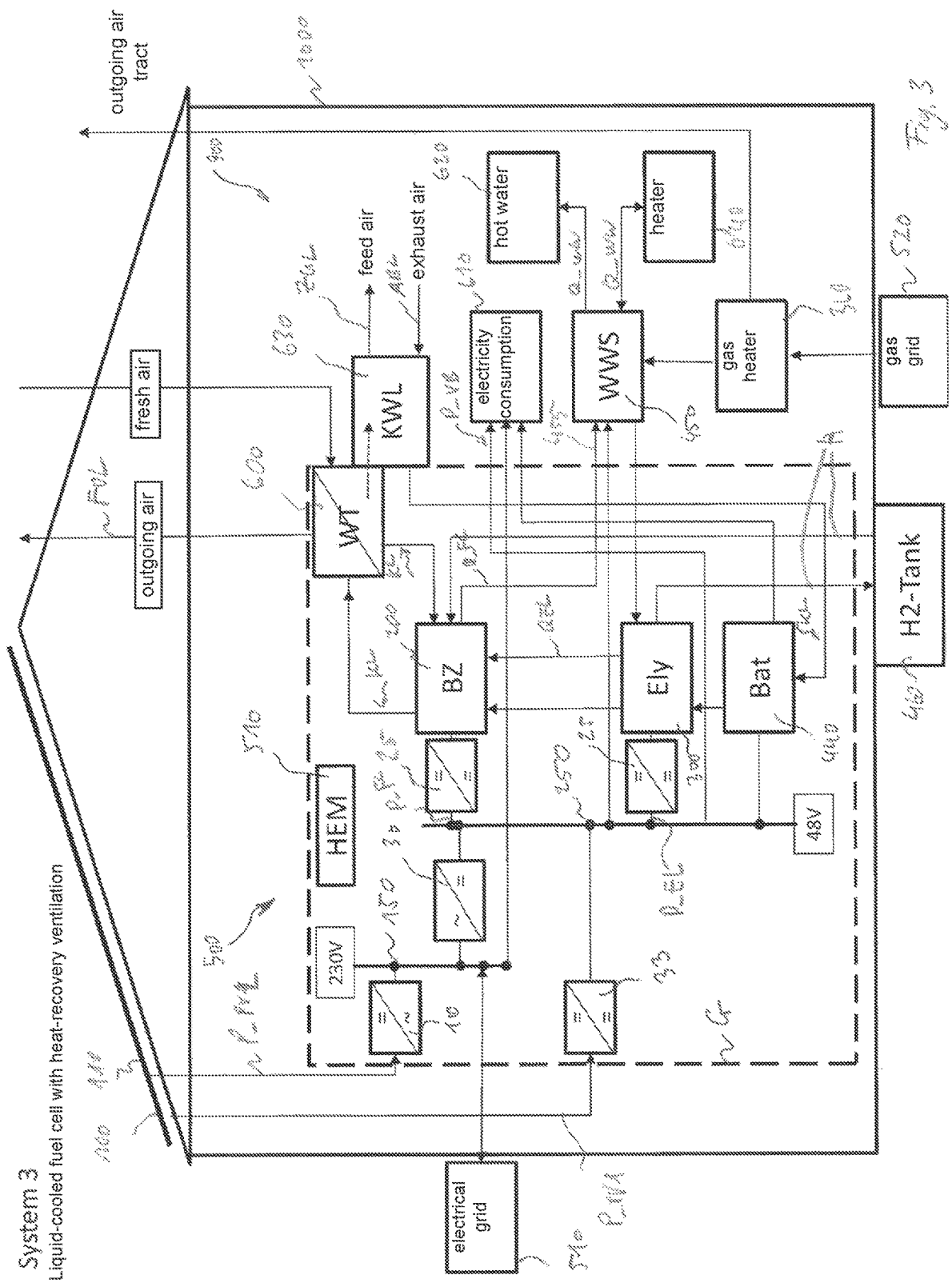
FIG. 3 a schematic illustration of a third exemplary embodiment of a domestic energy generation installation.

A passive house 1000 with controlled heat-recovery ventilation 630 in FIG. 3 is also equipped with a domestic energy generation installation 500. The flushing and cooling air KL of the domestic energy generation installation 500 is guided analogously to the embodiment of FIG. 1. Contrary to FIG. 1, a liquid-cooled fuel cell 200 is present so that the fuel cell heat amount Q_FC, as well, is released into the hot water storage unit 450 via a water circuit 455. The fuel cell unit 200 is also integrated into the flushing and cooling air KL circuit. A hot water heat amount Q_WW is provided for use as hot water and for heating purposes via the hot water storage unit 450. Optionally, the humid and warm cathode exhaust air of the fuel cell 200 may be guided into the feed air ZUL for an immediate use of the heat and humidity. In this embodiment, by way of example, an additional burner in the form of a gas heater 360 is present instead of the catalytic $H_2$ combustor, so that, however, the single-family home 1000 can be operated at least in an electrically self-sufficient manner and may, if the aspects concerning the thermal characteristics have been executed very well and if the dimensions of the domestic energy generation installation are of sufficient size, also achieve the zero-energy state, taking into consideration the surplus of electrical energy. Contrary to FIGS. 1 and 2, the domestic energy generation installation 500 of FIG. 3 has an optional electricity supply connection 510, via which the domestic energy generation installation 500 is connected to a 230 V low voltage grid. The domestic energy generation installation 500 of FIG. 3 also comprises a fuel connection 520, via which the domestic energy generation installation 500, or, more precisely, the gas heater 360, is connected to a gas grid. Alternatively, a connection to the gas grid may be omitted, for example if a pellet boiler or a heat pump is installed for heating.

Figure 4:
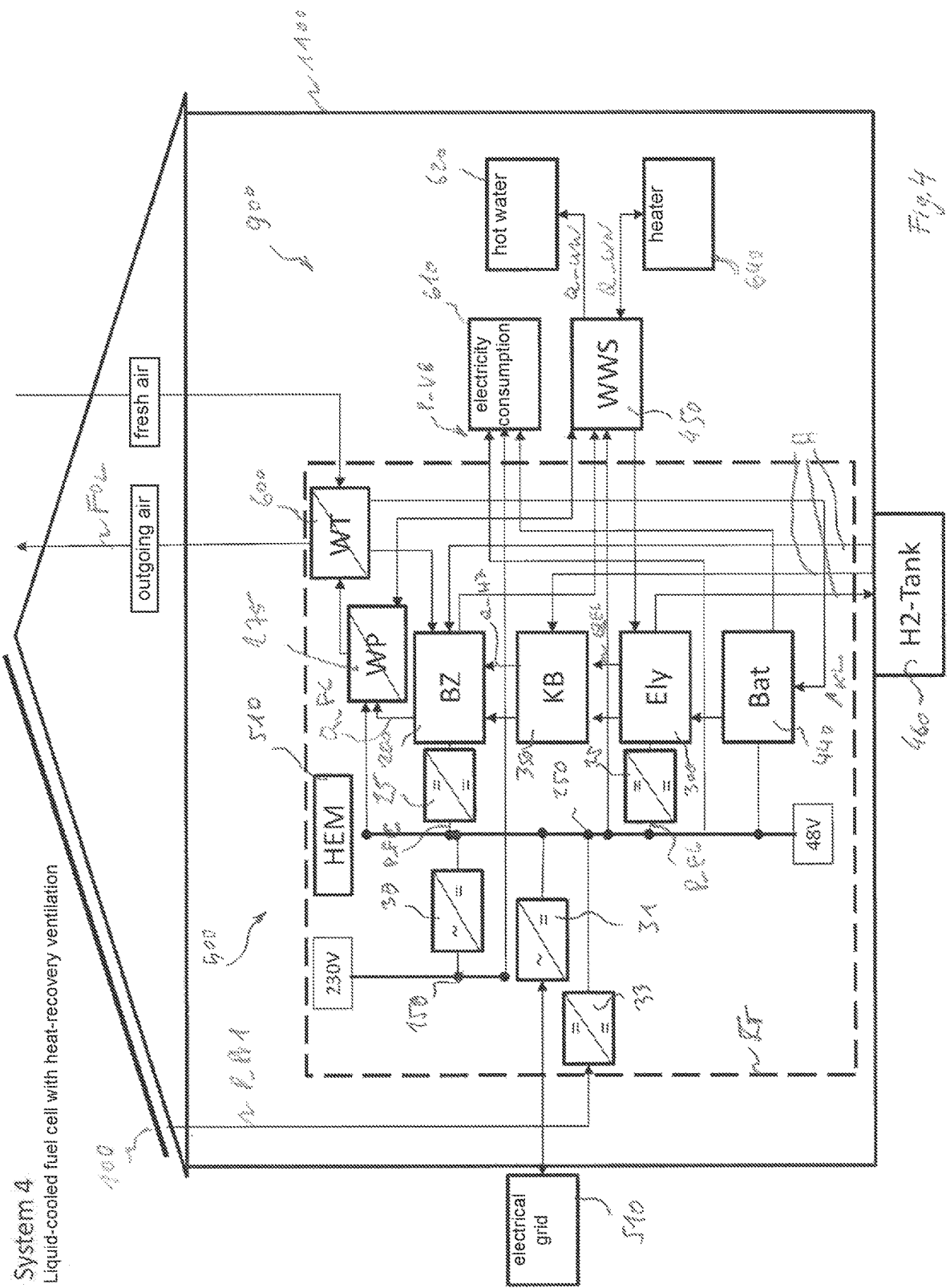
FIG. 4 a schematic illustration of a fourth exemplary embodiment of a domestic energy generation installation.

An existing building 1100 in FIG. 4 is also equipped with a domestic energy generation installation 500 and is a version of the system of FIG. 2. Just as in FIG. 2, no centrally controlled heat-recovery ventilation is installed in the existing building. Contrary to FIG. 2, the fuel cell 200 is water-cooled. Just as the electrolysis heat amount Q_EL of the electrolysis unit 300, the fuel cell heat amount Q_BZ is directly released into the hot water storage unit 450 via the cooling circuit. In the system of FIG. 2, the waste heat of the flushing and cooling air flow KL can be transferred into the hot water storage unit 450, preferably via a small heat pump 275. Instead of the catalytic hydrogen combustor, a pellet boiler or a gas heater may be also be used in case of a higher heat demand in this embodiment.

Figure 5:
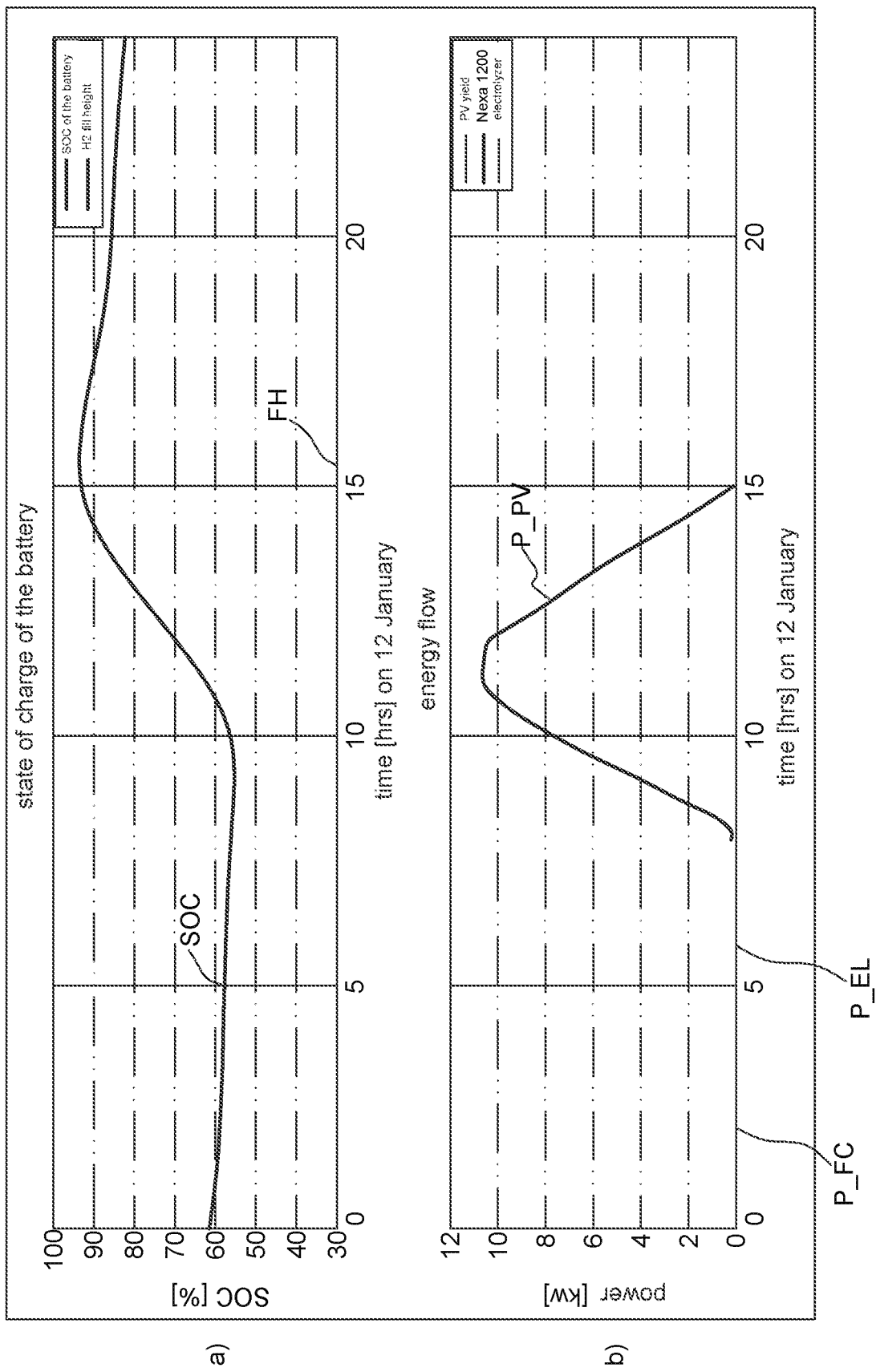
FIG. 5 a first diagram generated in the context of a numerical simulation of a domestic energy generation installation.
Figure 6:
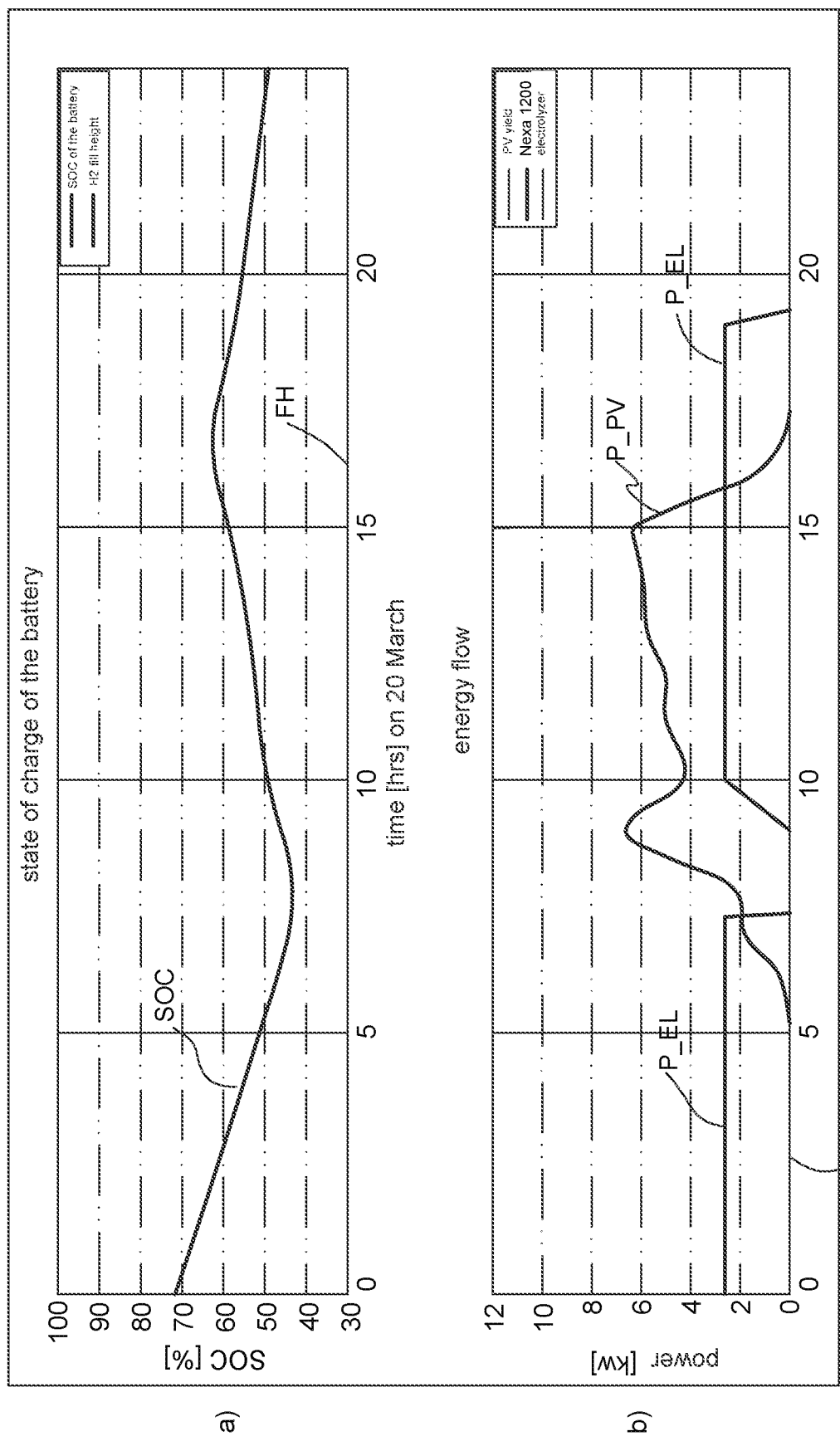
FIG. 6 a second diagram generated in the context of a numerical simulation of a domestic energy generation installation.

FIG. 5 shows a first diagram generated in the context of a numerical simulation of a domestic energy generation installation. The numerical simulation of FIG. 5 and FIG. 6 is based on a domestic energy generation installation with the following dimensions:

electric fuel cell nominal power: 600 W to 5000 W
electric electrolysis nominal input power: 500 W to 5000 W
capacity of the hydrogen tank: 10 kg to 80 kg $H_2$
nominal operating pressure of the hydrogen tank: 20-100 bar in the medium pressure range; 100 bar to 1000 bar in the high pressure range
capacity of the storage battery unit: 150 Ah to 1500 Ah at 48 V nominal voltage FIG. 5a) shows a simulation result for the behavior of the system where the control has been implemented with the above described energy management strategies. What is shown is the chronological development of the state of charge of the storage battery unit as well as the fill height FH of the hydrogen tank in percentage for a sunny winter day in January. FIG. 5b) shows the chronological development of the electric PV power P_PV in kW, the electric fuel cell power P_FC in kW and the electric electrolysis input power P_EL in kW for the same day.

As can be seen in FIG. 5a), by sunrise at approx. 8 am, the state of charge (P_PV>0) is still at least 55%. Since the electrical energy stored in the storage battery unit exceeds a predicted electrical consumption PVB' (not shown) of the house until sunrise and an electric PV power P_PV' (not shown) which predictably can be generated by the PV generator can be fully absorbed by the battery at any time and is sufficient for bringing the storage battery unit to a state of charge of more than 70% by sunset (P_PV=0), the fuel cell unit is not operated for the entire day, i.e. P_FC=0 kW and FH=0%.

Since an electric PV power P_PV' (not shown) which predictably can be generated by the PV generator is not sufficient for bringing the storage battery unit to a target state of charge determined as advantageous for this point in time of more than 95 percent by sunset, the electrolysis unit also remains inactive throughout the entire day, i.e. P_EL=0 kW.

FIG. 6 shows a second diagram generated in the context of a numerical simulation of a domestic energy generation installation. FIG. 6a) shows the chronological development of the state of charge of the storage battery unit as well as the fill height FH of the hydrogen tank in percent. FIG. 6b) shows the chronological development of the electric PV power P_PV in kW, the electric fuel cell power P_FC in kW and the electric electrolysis input power P_EL in kW. On the horizontal time axis of FIG. 6a) and FIG. 6b), the time of the day on 20 March is marked in hourly intervals.

As shown by FIG. 5a), the storage battery unit is operated at a state of charge of no more than 70 percent throughout the entire day so that the PV power P_PV can be stored in the storage battery unit in the most efficient manner.

Since an electric PV power P_PV' (not shown) which predictably can be generated by the PV generator is sufficient for bringing the storage battery unit to a target state of charge of more than 95 percent by sunset, the electrolysis unit is activated intermittently, i.e. P_EL>0 kW.

Figure 7:
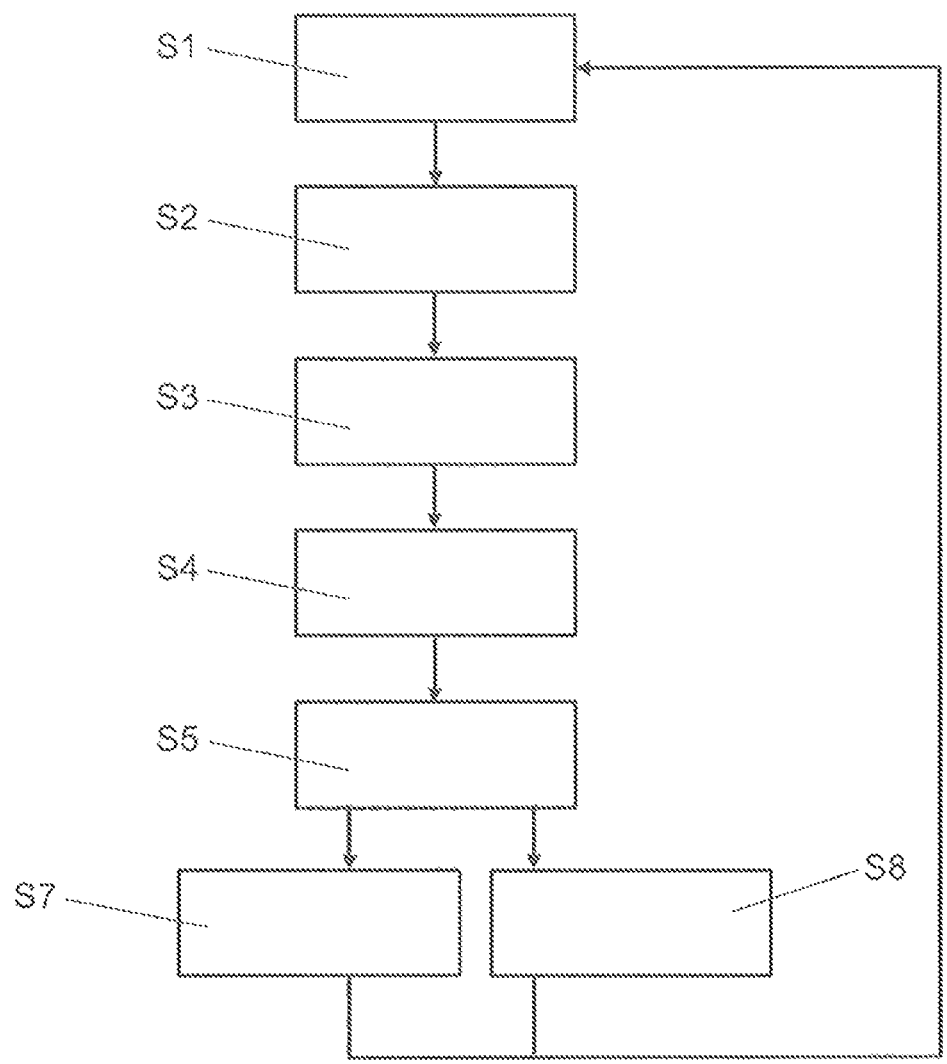
FIG. 7 a schematic illustration of an exemplary realization of a method for operating a domestic energy generation installation.

An exemplary method for operating a domestic energy generation installation is shown in FIG. 7.

In a first step S1, at least one expectation time period, wherein the at least one expectation time period preferably extends until energy of a regenerative energy source is once again available after the next possible sunrise, is determined or prespecified.

In a second step S2, an expected load profile of an electricity consumer, in particular the electric power consumption of said electricity consumer during the at least one expectation time period, is determined, In a third step S3, an expected yield profile of the regenerative energy source in the at least one expectation time period, preferably an electrical PV power of a PV generator, is determined.

In a fourth step S4, a minimum consumption power which should at least be available for withdrawal from the storage battery unit at any one time is determined or prespecified, and/or an end-of-discharge voltage of the storage battery unit which should not be undershot at any time is prespecified.

In a fifth step, a target state of charge of the storage battery unit (440) and an energy balance over at least one expectation period from the expected yield profile and the expected load profile are determined.

In a sixth step S6, a time range of the storage battery unit is determined from the expected load profile, the expected yield profile and the minimum consumption power, which should not be undershot at any time, and from a currently determined state of charge of the storage battery unit and, preferably, from the end-of-discharge voltage.

In a seventh step S7, the fuel cell unit is operated with a fuel cell power depending on the determined time range of the storage battery unit; the fuel cell unit will, in particular, be switched on if the determined time range of the storage battery unit is shorter than the at least one expectation time period and/or the fuel cell unit will be switched off if the determined time range of the storage battery unit is longer than the at least one expectation time period, In an eighth step S8, which can be performed simultaneously to the seventh step S7, the electrolysis unit is operated, in particular with a calculated electrolysis power, depending on the determined energy balance; the electrolysis unit will, in particular, be switched on if the determined energy balance is positive and/or the electrolysis unit will be switched off if the determined energy balance is negative.

The method pursuant to the invention for operating a domestic energy generation installation of the exemplary embodiment of FIG. 7 will be executed recursively after the seventh step S7 and/or eighth step S8, starting with the first step S1.

What is claimed is:

1. A method for operating a domestic energy generation installation for self-sufficient electricity supply and for CO2-neutral, self-sufficient heat supply for single- and two-family homes, comprising the steps of:
   determining or prespecifying at least one expectation time period, wherein the at least one expectation time period extends as a short-term expectation time period until energy of a regenerative energy source is once again available after the next possible sunrise,
   determining an expected load profile of an electricity consumer including the electric power consumption of said electricity consumer during the at least one expectation time period,
   determining an expected yield profile of the regenerative energy source in the at least one expectation time period, including an electrical PV power of a PV generator,
   determining or prespecifying a minimum consumption power which should at least be available for withdrawal from a storage battery unit at any one time, and/or prespecifying an end-of-discharge voltage of the storage battery unit which should not be undershot at any time,
   determining a target state of charge of the storage battery unit and an energy balance over the at least one expectation period from the expected yield profile and the expected load profile,
   determining a time range of the storage battery unit from the expected load profile, the expected yield profile and the minimum consumption power, which should not be undershot at any time, and from a currently determined state of charge of the storage battery unit and from the end-of-discharge voltage,
   operating a fuel cell unit with a fuel cell power depending on the determined time range of the storage battery unit, including switching on the fuel cell unit if the determined time range of the storage battery unit is shorter than the at least one expectation time period and/or switching off the fuel cell unit if the determined time range of the storage battery unit is longer than the at least one expectation time period,
   operating an electrolysis unit with a calculated electrolysis power, depending on the determined energy balance, including switching on the electrolysis unit if the determined energy balance is positive and/or switching off the electrolysis unit if the determined energy balance is negative.

2. The method according to claim 1, wherein the fuel cell unit is operated at optimum efficiency if, with the pertaining fuel cell performance a target state of charge of the storage battery unit is achievable within the at least one expectation time period.

3. The method according to claim 1, wherein in the short-term expectation time period, the point in time when the regenerative energy runs out, including the point in time of the sunset, is assigned at least one intermediate target state of charge of the storage battery unit which is to be or is able to be achieved.

4. The method according to claim 1, wherein the expected yield profile in the respective expectation time period is determined based on time sequences which extend over one full annual cycle and represent a yield of the regenerative energy source for the location of the regenerative energy source based on several years of climate data, including taking into consideration a set-up situation of the regenerative energy source and/or current prediction values and/or a current system configuration and/or the current state of aging of the regenerative energy source.

5. The method accordingly to claim 1, wherein the load profile is determined within the respective expectation time period based on time sequences which extend over a full annual cycle and represent the consumption of electrical energy of the electricity consumer (610) and which are adjusted or adjustable to an individual user behavior via interactive user input and/or a remote management system.

6. The method according to claim 1, wherein, depending on demand, further electricity consumers may be switched on and off and/or a variable power connection to an electrical grid may be executed.

7. The method according to claim 1, wherein a configuration is executed via a remote management system for the purpose of adjusting the time sequences and/or the yield profile and/or during which an information exchange with an energy system network takes place.

8. The method according to claim 1, wherein the fuel cell unit is operated in a performance-oriented manner, in dependence on the determined energy balance.

9. The method according to claim 1, wherein the point in time and the amount of a heating energy demand of a house supplied by the domestic energy generation installation are also taken into account for prespecification of the fuel cell power.

10. The method according to claim 1, wherein the target state of charge of the storage battery unit is determined for the end of the short-term expectation time period taking into account a medium-term expectation time period which extends over one week and includes a weather forecast and/or taking into account a long-term expectation time period which extends over one year, and/or wherein the target state of charge is determined taking into account a service life condition of the domestic energy generation installation.

11. The method according to claim 1, wherein the fuel cell unit is operated at least until the storage battery unit has reached a prespecified or respectively newly calculated target state of charge.

12. The method according to claim 1, wherein the electrolysis unit is operated in a performance-oriented manner in dependence on the determined energy balance.

13. The method according to claim 1, wherein the target state of charge of the storage battery unit is calculated for the at least one expectation time period, wherein the target stage of charge depends on the expected energy balance in the at least one expectation time period, on current condition values of the domestic energy generation installation, such as energy content of the different storage units and/or aging conditions of the energy converters, including the storage battery unit, the fuel cell unit, the electrolysis unit and/or the PV generator.

14. The method according to claim 1, wherein, depending on the demand, the fuel cell unit may be operated intermittently, in such a way that the times in standby are less than 10 minutes, respectively.

15. The method according to claim 1, wherein the fuel cell unit will not be operated if a predicted state of charge of the storage battery unit at the end of the short-term expectation time period is higher than the target state of charge of the storage battery unit without generation of $H_2$ by the electrolysis unit.

16. The method according to claim 1, wherein the electrolysis unit is operated at optimum efficiency, if, at the end of the short-term expectation time period, the state of charge of the storage battery unit is achievable and if the power generated in a regenerative manner may be used at any time via the electrical consumption and/or the storage battery unit and/or the thermal storage unit.

17. The method according to claim 1, wherein the electrolysis unit is operated at optimum efficiency if the determined energy balance is smaller than or equals 0 so that the electrolysis unit must, at least intermittently, be operated by means of the storage battery unit.

18. The method according to claim 1, wherein the electrolysis unit is operated for load levelling in a performance-oriented manner, including in dependence on the fill height of the hydrogen tank and/or the energy balance.

19. The method according to claim 1, wherein the electrolysis unit will not be operated if an electrical energy which is predictably able to be generated by the regenerative energy sources is not sufficient for bringing the storage battery unit to a calculated target state of charge by sunset.

20. The method according to claim 1, wherein the electrolysis unit is operated in dependence on an actually supplied PV power.

21. The method according to claim 1, wherein a heating rod arranged in a hot water storage unit will be electrically connected to the DC injection point and/or the AC injection point if a power surplus exists at the respective injection point which cannot be absorbed by the electrolysis unit in the form of an electrolysis input power.

22. The method according to claim 1, wherein a maintenance charging of the storage battery unit is preceded by a charging of the storage battery unit to at least approximately 85% by means of regenerative sources, the point in time for initiating the maintenance charging is flexibly determined via the predictive energy management and wherein the maintenance charging is then executed independently from the availability of regenerative energy via the fuel cell unit.

23. The method according to claim 1, wherein the charging management of the storage battery unit and/or the use of the long-term storage system for storing and/or the load management are determined via the predictive energy management, and wherein the PV charge regulators, the fuel cell and the electrolysis unit are directly controlled by the energy management.

24. The method according to claim 1, wherein the operation of the fuel cell unit is performed through a 48 volt DC injection point of the domestic energy generation installation without a voltage converter upstream of the fuel cell unit.

25. A domestic energy generation installation for a self-sufficient electricity supply and for a CO2-neutral self-sufficient heat supply, for single- or two-family houses, comprising
 a DC injection point, designed for a nominal voltage of 48 volt, and/or an AC injection point, designed for a nominal voltage of 230 volt or 110 volt, wherein, during operation, the DC injection point and/or the AC injection point are at least intermittently connected to an electricity consumer having a consumption power,
 a PV generator at least intermittently electrically connected to the DC injection point and/or the AC injection point for generating an electric PV power and/or a wind turbine at least intermittently connected and/or another installation for generating energy from regenerative sources that is at least intermittently connected,
 a fuel cell unit at least intermittently electrically connected to the DC injection point for generating electric fuel cell power,
 an electrolysis unit electrically connected to the DC injection point for generating hydrogen to be consumed by the fuel cell unit, wherein, during operation, the electrolysis unit is supplied with electric electrolysis input power,
 a hydrogen tank, which is a long-term energy storage unit, which is at least intermittently fluidly connected to the fuel cell unit and the electrolysis unit and is designed to store hydrogen to be generated by means of the electrolysis unit and to be consumed by the fuel cell unit, a storage battery unit in the form of a short-term energy storage unit, which is or is to be connected to the DC injection point so that an electric PV power and an electric fuel cell power can be stored in the storage battery unit, and an electric electrolysis input power and a consumption power can be withdrawn from the storage battery unit; and a control module for controlling the domestic energy generation installation, in accordance with claim 1.

26. The domestic energy generation installation according to claim 25, comprising a thermal storage unit, including a hot water storage unit, which, at the input side, is, at least intermittently, thermally connected to the electrolysis unit and/or to the fuel cell unit and/or a catalytic $H_2$ combustor so that an electrolysis heat amount and/or a fuel call heat amount and/or a heat amount of a catalytic $H_2$ combustor can be released into the thermal storage unit, and which, at the output side, is at least intermittently, thermally connected to a hot water heating unit and/or a water consumer so that a hot water heat amount can be released into a living space and/or to the water consumer, and which has a heating rod, which is, at least intermittently, electrically connected to the DC injection point and/or AC injection point.

27. The domestic energy generation installation according to claim 25, wherein the fuel cell unit is or is able to be thermally connected to a ventilation-heating device designed to ventilate and/or heat a living space so that a fuel cell heat amount can be released into to the living space.

28. The domestic energy generation installation according to claim 25, wherein, via a coolant line, the fuel cell unit is or is able to be thermally connected to the ventilation-heating device designed to ventilate and/or heat a living space and/or a hot water storage.

29. The domestic energy generation installation according to claim 25, further comprising an air-air heat exchanger which is, at least intermittently, thermally connected to ventilation/flushing of the electrolysis unit and/or of the fuel cell unit and/or a battery storage unit and/or of the power electronics and/or a catalytic combustor, and via which the collected exhaust heat of the connected modules can be released into a living space.

30. The domestic energy generation installation according to claim 25, comprising an additional burner from the group of catalytic hydrogen combustors, gas heaters, pellet boilers, wherein, at the output side, the additional burner is or is able to be thermally connected to a hot water storage unit so that a heating heat amount can be released into the hot water storage unit.

31. The domestic energy generation installation according to claim 25, comprising an electricity supply connection, via which the domestic energy generation installation is or is able to be connected to a low voltage grid, and/or a fuel connection, via which the domestic energy generation installation is or is able to be connected to a gas grid or an oil tank.

32. The domestic energy generation installation according to claim 25, comprising a small wind turbine for generating an electric wind power and/or another installation for generating energy from regenerative sources, wherein the storage battery unit is electrically connected to the small wind turbine and/or another installation for generating energy from regenerative sources so that an electric wind power and/or an electric power of another installation for generating energy from regenerative sources can be stored in the storage battery unit.

33. The domestic energy generation installation according to claim 25, wherein a thermal energy storage unit is realized as a hot water storage unit as a stratified tank.

34. The domestic energy generation installation according to claim 25, wherein the battery unit consists of at least one line of a cycle-proof battery type, which is dynamically relieved via an ultra-short-term storage unit with high performance and little energy content, including a super-capacity or an Li-based storage battery.

35. The domestic energy generation installation according to claim 25, wherein the fuel cell unit and the electrolysis unit and/or the control electronics/electrics and/or SuperCap and/or battery and/or catalytic combustor are arranged in a shared housing or in several housings connected via a ventilation.

\* \* \* \* \*